No. 694,531. Patented Mar. 4, 1902.
G. P. COOLEY.
HALTER.
(Application filed Aug. 13, 1901.)
(No Model.)
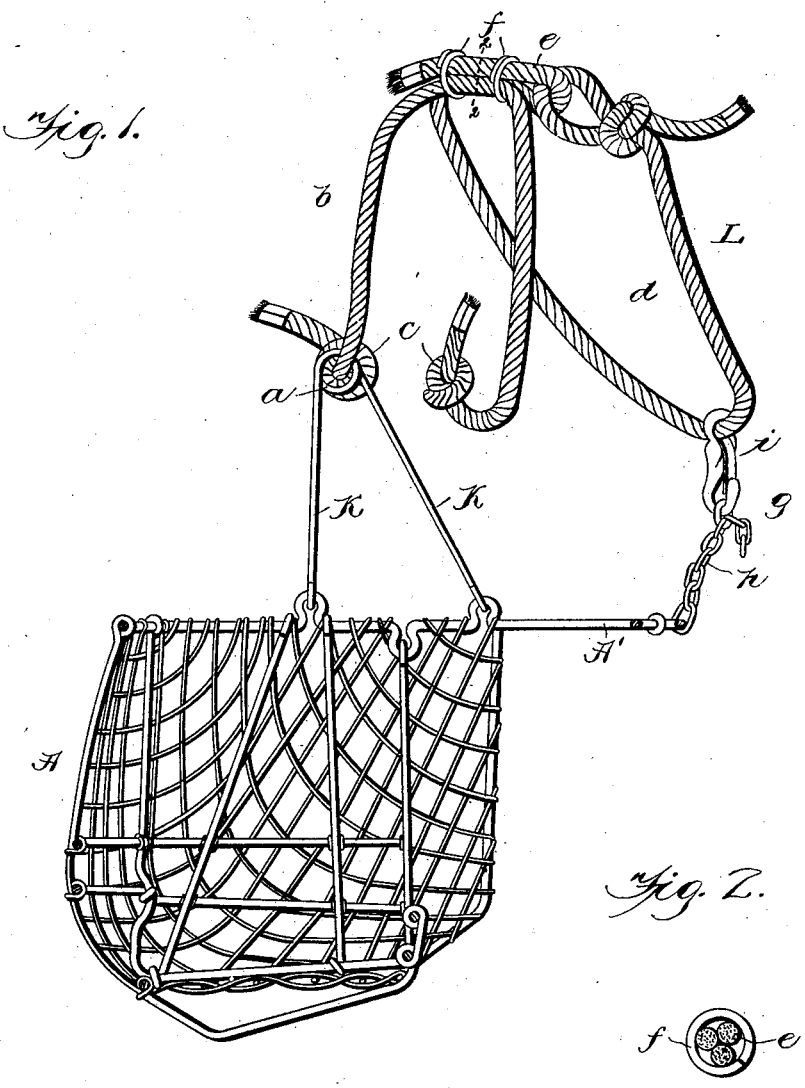
Witnesses
Inventor
George P. Cooley
By James Phuchy
Attorney

UNITED STATES PATENT OFFICE.

GEORGE P. COOLEY, OF KANSAS CITY, KANSAS.

HALTER.

SPECIFICATION forming part of Letters Patent No. 694,531, dated March 4, 1902.

Application filed August 13, 1901. Serial No. 71,926. (No model.)

*To all whom it may concern:*

Be it known that I, GEORGE P. COOLEY, a citizen of the United States, residing at Kansas City, in the county of Wyandotte and State of Kansas, have invented new and useful Improvements in Halters, of which the following is a specification.

My invention relates to improvements in halters, and consists in a peculiar halter which while susceptible of being used to advantage in other connections is designed more especially for securing the muzzle disclosed in my contemporary application filed January 17, 1901, Serial No. 43,630, on the head of a cow, calf, or colt in such manner as to effectually prevent the cow, calf, or colt from rubbing or scratching it off.

The invention will be fully understood from the following description and claims, when taken in conjunction with the annexed drawings, in which—

Figure 1 is a view illustrating the muzzle forming the subject-matter of my aforesaid contemporary application in longitudinal central section and my improved halter in perspective, and Fig. 2 is an enlarged transverse section taken in the plane indicated by the line 2 2 of Fig. 1.

Referring by letter to the said drawings, A is the muzzle, which in addition to other features comprises an oval head-bow A' and hangers K K, connected to the sides of the bow and having eyes *a* at their upper ends, and L is my improved halter, through the medium of which the muzzle is secured in its operative position on the head of a calf, colt, or cow. This halter may be made of chain, leather, or other materials suitable to the purpose. I prefer, however, to make it of rope and have it comprise a headstall *b*, the ends of which are passed through the eyes of the hangers K and provided with knots *c*, a throat-latch *d*, which has a loop *e* at one end, and rings *f*, which surround the loop *e* and the middle of the headstall *b* and connect the same, as shown in Figs. 1 and 2. The rings *f* are preferably of metal, as is also the jaw-strap *g*. The jaw-strap is preferably made up of a chain *h*, which is connected to the rear end of the muzzle-bow A', and a snap-hook *i*, which has an eye receiving the throat-latch and is arranged to engage the chain after the manner shown in Fig. 1.

In applying my improvements to an animal the muzzle is placed so that there is about one inch play-space between its bottom and the nose of the animal, and the halter is placed with the middle of the headstall *b* and the loop *e* of the throat-latch *d* on the animal's head immediately behind the ears. The throat-latch is then passed beneath the throat of the animal, and its free end is tied into the bight of the loop *e*. With this done the jaw-strap is properly adjusted, when the device is ready for use.

While I prefer, as stated, to make the halter L of rope, I desire it distinctly understood that it may be made of any other suitable material, provided the throat-latch is connected to the middle of the headstall and such point of connection is arranged so as to rest on the animal's head immediately in rear of the ears, for by virtue of this and the jaw-strap interposed between the throat-latch and the bow A' the calf, colt, or cow is effectually prevented from scratching or rubbing off the muzzle. Moreover, by virtue of the ends of the headstall *b* resting loose in the eyes *a* of the hangers K it will be seen that the muzzle is free to swing on the headstall when the animal puts its head down to graze and also when the animal raises its head.

The adjustable jaw-strap is adapted to be used to advantage in adjusting and securing the muzzle on the heads of calves and colts. When the muzzle is used on a cow with a view of preventing her from sucking herself and the halter is properly adjusted, the cow is enabled to graze and eat with perfect freedom and yet is effectually prevented from sucking herself when she lays down for such purpose.

While designed more particularly for use in conjunction with the muzzle of my contemporary application, it is obvious that my improved halter may be employed to advantage on animal-muzzles of other constructions.

Having described my invention, what I claim, and desire to secure by Letters Patent, is—

1. The combination of an animal-muzzle having a head-bow, and a halter comprising a headstall connected at its ends to opposite sides of the muzzle, a throat-latch connected to the middle of the headstall and adapted to rest with the same on the head of an animal immediately in rear of the ears, and an adjustable jaw-strap interposed between and connecting the throat-latch and the rear portion of the head-bow of the muzzle.

2. The halter described comprising a headstall, the ends of which are adapted to be provided with knots, a throat-latch having a loop arranged parallel to the middle portion of the headstall, rings surrounding and connecting said loop of the throat-latch and the middle portion of the headstall, and a jaw-strap adjustably connected to the throat-latch.

3. The combination with an animal-muzzle having an oval head-bow, and hangers connected to opposite sides of said bow and provided with eyes; of a halter comprising a headstall the ends of which are passed through the eyes of the hangers and provided with knots, a throat-latch having a loop arranged parallel to the middle portion of the headstall, rings surrounding and connecting said loop of the throat-latch and the middle portion of the headstall, and a jaw-strap adjustably connected to the throat-latch, and interposed between and connecting the same and the rear portion of the head-bow.

In testimony whereof I have hereunto set my hand in presence of two subscribing witnesses.

GEORGE P. COOLEY.

Witnesses:
HENRY A. F. SCHROEDER,
JOHN J. COUGHLIN.